No. 610,283. Patented Sept. 6, 1898.
P. G. DE SCHODT.
INCANDESCENT GAS BURNER.
(Application filed Oct. 19, 1897.)
(No Model.)
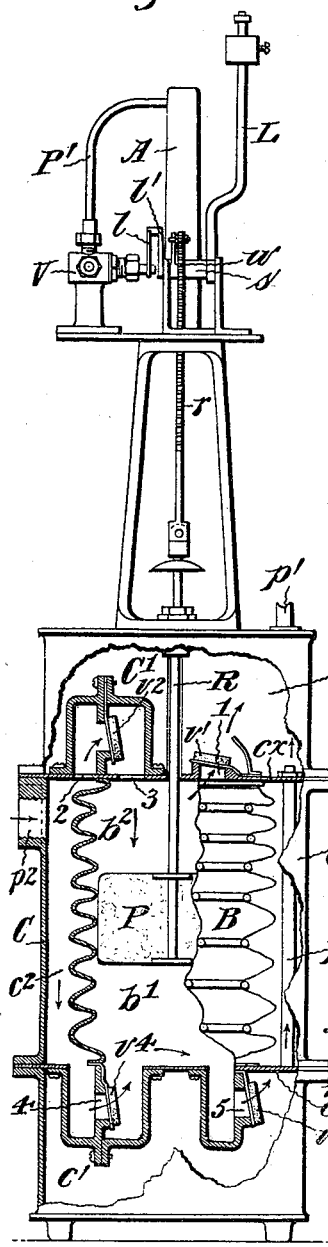
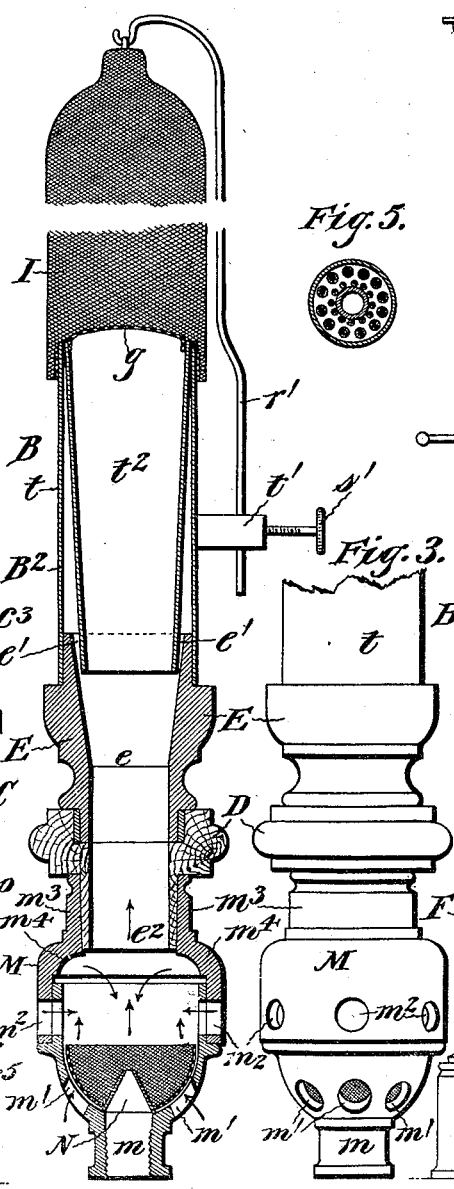
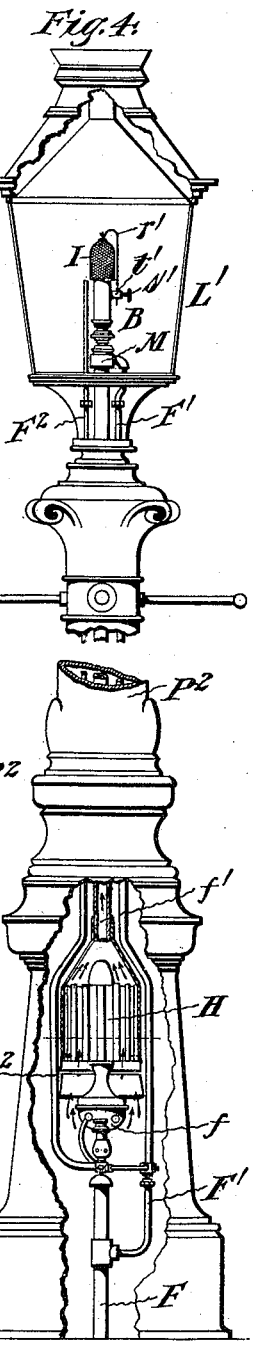
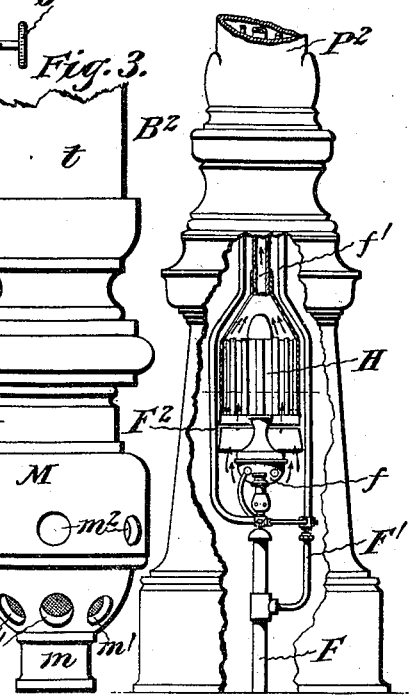
Witnesses:
B. S. Ober.
[signature]
Inventor:
Paul Greyson de Schodt,
by [signature]
Attorney.
THE NORRIS PETERS CO., PHOTO-LITHO., WASHINGTON, D. C.

UNITED STATES PATENT OFFICE.

PAUL GREYSON DE SCHODT, OF NAMUR, BELGIUM.

INCANDESCENT GAS-BURNER.

SPECIFICATION forming part of Letters Patent No. 610,283, dated September 6, 1898.

Application filed October 19, 1897. Serial No. 655,704. (No model.)

*To all whom it may concern:*

Be it known that I, PAUL GREYSON DE SCHODT, of Namur, in the Kingdom of Belgium, have invented certain new and useful Improvements in the Art of Illumination by Incandescence; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to the art of illumination by incandescence.

As is well known, the problem of obtaining high temperatures has been solved by the forced-draft blowpipe, in which the three essential conditions to the attainment of high temperatures are fulfilled—namely, the production of a gaseous mixture of five volumes of air to one of gas, the intimate admixture of the two fluids, and the preservation of the proper energy or velocity of flow of the mixture at the point of combustion—and I have found that in the forced-draft blowpipe there is a large proportion of energy lost or wasted owing to the too violent contact of the air with the gas.

My invention has for its object the application of the principles involved in the forced-draft blowpipe to the art of illumination by incandescence without loss of energy, and this I have accomplished without recourse to high pressures or velocities of flow of the gaseous compound. I have also found that the required pressure or velocity of flow may be imparted to the gaseous compound either by the air or the gas and that the pressure or velocity of flow of the gas need not greatly exceed the normal velocity at which the illuminating-gas flows from an ordinary burner in order to entrain the required quantity of air to produce a gaseous compound such as referred to above.

By the simple appliance hereinafter to be described I obtain a flame of a temperature as high as 1,500° centigrade with a pressure not exceeding that of a column of water of from one hundred to one hundred and fifty millimeters or with a normal pressure when the gas is injected into a heated atmosphere. In the former case a suitable compressor will be necessary, as described in my application for patent of the United States, filed June 16, 1896, Serial No. 595,780; but that my invention may be fully understood I will describe the same in detail, reference being had to the accompanying drawings, in which—

Figure 1 is a sectional elevation of the compressor and its motor, which is shown in its normal or non-operative position. Fig. 2 is a vertical section of the burner, and Fig. 3 an elevation thereof. Fig. 4 is a vertical sectional elevation illustrating my invention in its application to street-lighting, and Fig. 5 is a cross-section of the air-heater.

The compressor, Fig. 1, consists of a bellows B, contained within a casing C, divided into three chambers $c'$ $c^2$ $c^3$ by two partitions $c$ $c^\times$. The chambers $c'$ and $c^3$ communicate with each other through one or more pipes $p$. About midway between the upper and lower ends of the bellows is secured a piston P, that divides said bellows practically into two fluid-tight chambers $b'$ $b^2$ and practically into two separate compressing-chambers. In the upper partition $c^\times$ are formed three gas ports or passages 1 2 3. Port 1 leads into chamber $c^3$ and is normally closed by a check-valve $v'$, and ports 2 and 3 lead into a casing C' on opposite sides of a partition, in which is formed a valve-port, likewise normally closed by a check-valve $v^2$. The upper end of the bellows B, which is of less diameter than that of its inclosing casing C, is so secured to partition $c^\times$ that the ports 1 and 3 therein open into the upper bellows-chamber $b^2$, while port 2 opens into the central chamber $c^2$ of the said inclosing casing C. A substantially similar arrangement of ports and valves is provided in the lower partition $c$—namely, a port 4, normally closed by a valve $v^4$, places the central chamber $c^2$ of casing C in communication with the lower chamber $b'$ of bellows B, and a port 5, normally closed by a valve $v^5$, places said lower bellows-chamber $b'$ in communication with the lower casing-chamber $c'$ and through the pipe or pipes $p$ with the upper casing-chamber $c^3$, which constitutes the delivery-chamber, and is provided with a suitable outlet-pipe $p'$ to be connected with the gas-distributing pipes that carry the burners.

Assuming the parts to be in the position shown in Fig. 1 and supposing the piston to be moved upwardly, a partial vacuum will be formed in the lower bellows-chamber $b'$, whereby and under the normal pressure of the gas flowing into the central chamber $c^2$ through branch pipe $p^2$, connected with the supply main, the valve $v^4$ will open, filling the lower bellows-chamber $b'$ with gas. When the movement of the piston P is reversed, the valve $v^5$ will open and the gas will be forced out of said lower bellows-chamber under an increased pressure into the lower casing-chamber $c'$ and from the latter, through pipe or pipes $p$, into the delivery-chamber $c^3$, and thence to the burner or burners. During the downward movement of the piston P the valve $v^2$ will open to admit gas into the upper bellows-chamber, which gas is on the next upward movement of the piston P forced directly into chamber $c^3$ through port 1, valve $v'$ opening under the pressure of the gas. As shown, the seats for all the valves above referred to are inclined, and the said valves are made sufficiently heavy, so as not to open under the normal pressure of the gas in the service-mains. In practice I make the piston P as light as may be consistent, and to this end I make it of wood.

Any suitable motor may be employed for imparting a reciprocating motion to the piston P, and in Fig. 1 I have shown a motor adapted to be operated by any suitable motive fluid of comparatively low power, as water under the normal head, or pressure existing in city-water distribution, or carbonic-acid gas, or compressed air, or exhaust-steam.

The piston-rod R has at its upper end a piston that works in the motor-cylinder A, and has also secured thereto a rack-bar $r$ in gear with a toothed wheel $w$, on the shaft $s$ of which is secured a weighted lever L, that actuates a four-way valve V through the levers $l\ l'$ whenever said lever L is moved from its normal horizontal position beyond the vertical axial plane of the shaft.

The burner B is constructed as follows: M is the mixing-chamber, provided with a branch $m$ for connection with the gas-supply pipe leading to the compressor and with an injector-nozzle N, projecting axially into said chamber. The lower part of the mixing-chamber is spherical or substantially so, and has a series of air-ports $m'$ arranged around the base of the injector-nozzle, which ports are preferably covered with wire-gauze to divide the inflowing air as much as possible. There is a second circular row of air-ports $m^2$ in the said mixing-chamber which are preferably not covered with wire-gauze, whereby inflowing currents of air are set up that converge toward and flow at right angles to the entering jet of gas. At its upper end the interior wall-surfaces of the mixing-chamber M are formed of paraboloidal curves converging to the outlet-passage in branch $m^3$ of said chamber, as shown at $m^4$. In the outlet branch $m^3$ of the mixing-chamber M is secured the support for the burner proper, $B^2$, which support I prefer, for reasons hereinafter explained, to construct in two parts D and E, the bore or passage in which is gradually contracted from the outlet $e'$ to a point $e$ nearer said outlet than the inlet $e^2$ of said passage.

On the part E of the support is seated the burner proper, $B^2$, which consists of a cylindrical burner-tube $t$, provided with a radial arm $t'$, having a perforation for the passage of the supporting-rod $r'$ for the incandescible body I, to which arm said rod is adjustably secured by means of a binding-screw $s'$. The mouth of the burner-tube $t$ is covered with wire-gauze $g$ and has secured therein a second downwardly-tapering tube $t^2$, whose upper wider end is of the same diameter and is secured in the outlet end of the outer tube $t$, while the lower narrower end of tube $t^2$ projects into the passage of the upper part E of the burner-support.

In a burner constructed as described the jet of gas issuing from the injector-nozzle N under a greater than normal pressure produces a considerable vacuum in the mixing-chamber M, where a strong flow of air is set up through the ports $m'$, whose axes are parallel with the generatrix of the cone-nozzle N, so that the jet of gas will be enveloped by a body of air. Simultaneously therewith a flow of air is set up through the ports $m^2$ in a plane at right angles to the plane of flow of the air-enveloped body of gas and is likewise entrained or carried along; but before the enveloping air reaches the outlet of the mixing-chamber it is deflected toward the axis of said chamber in a downward direction in opposition to the flow of gas, whereby an intimate admixture of the two fluids is effected, the velocity of the mixture from the chamber to the burner being increased by the gradual contraction of the passage in the burner-support D E, so that said mixture will issue in a divided condition from the wire-gauze $g$ with considerable velocity, producing a short intensely-hot flame. This is necessary, because if the combustible mixture were to flow out of the burner at a moderate velocity the combustion of the gases would take place immediately above the wire-gauze and the intense heat would speedily destroy the same and result in back-firing, which is avoided when the gaseous mixture issues from the burner at a proper velocity, so that combustion will take place at such distance above the wire-gauze as not to injure the same.

In order to obtain a combustible gaseous mixture similar to that of the blow-pipe— namely, five volumes of air to one volume of gas—I provide two sets of air-ports and arrange them as described, the number of these air-ports being dependent upon the area of the injector-orifice. By the construction of the mixing-chamber M and the passage leading therefrom to the burner the waste or lost energy due to the very violent contact of the gas and air in the blowpipe is avoided, and although the velocity of flow of the gaseous mixture is somewhat diminished by the slight expansion of the gas in the mixing-chamber and the action thereon of the inflowing air-currents this lost velocity is restored to the gaseous mixture while flowing from the mixing-chamber to the burner by gradually contracting the passage through which said mixture flows before it reaches the burner.

It is obvious that the whole burner, excepting the inserted downwardly or inwardly tapering tube $t^2$, could be made of a single piece. It is, however, of importance that the gas and air entering the mixing-chamber should not be materially influenced by heat radiated from the burner and thereby unduly expand the same, to which end I prefer to construct the burner as described, all of its parts being made of metal except the lower part D of the burner-support, in the construction of which I employ a substance that is a non-conductor of heat, as wood or other non-conductor of heat. The radiation of heat from the burner is, however, further materially reduced by the arrangement of the downwardly-tapering tube $t^2$, whereby a dead-air chamber is formed between it and the burner-tube $t$. The inserted tapering tube $t^2$ performs also the function of an expansion-chamber to reduce the velocity or pressure of the gaseous mixture to the degree required in effecting the combustion at a point sufficiently remote from the wire-gauze $g$ to prevent the latter from being destroyed by the intense heat.

Under some conditions the use of a compressor to impart to the gas the required velocity of flow is either impossible or impracticable, this being particularly the case in street lighting, and to enable me to apply my invention to this purpose I utilize the properties of heated air not only to obtain a mixture of air and gas in the proportions hereinabove stated, but also to impart to the mixture the required velocity of flow. As is well known, when a tube open to the atmosphere at both ends is heated an ascending air-current is set up, the velocity of which depends upon the height of the tube and the degree of heat applied thereto. I avail myself of these principles in the application of my invention to street-lighting by heating at the base within a lamp-post a tube leading to the mixing-chamber of the burner, in order to establish a hot-air current of sufficient velocity to increase the action of the injector.

In Fig. 4, $p^2$ indicates a lamp-post into the base of which projects the gas-service pipe F, that carries a burner $f$, above which is arranged a tubular air-heater H of well-known construction, and whereby an upward current of hot air is set up that ascends through pipe $f'$ to the mixing-chamber M of the burner B in the lantern L', around the injector-nozzle therein, to which gas is supplied from pipe F through a branch pipe F', there being a second branch pipe $F^2$, whose outlet is proximate to the burner-orifice for the purpose of igniting the gaseous compound issuing therefrom after the gas has been turned on to feed the burner $f$ and the injector in the mixing-chamber, suitable stop-cocks (not shown) being provided for controlling the flow of gas from the service-pipe F to the burner $f$ and branch pipes F' and $F^2$.

I have hereinabove referred to the use of a mixture of ordinary illuminating-gas; but it will readily be understood that carbureted air or hydrogen can likewise be used, and experiments have demonstrated that equally as good results are obtained in the use of such and that the invention can be made use of for the purposes of heating. Furthermore, the means for imparting additional energy or velocity of flow to the gas can be dispensed with if the normal pressure of the gas-supply is sufficiently high, as will be readily understood.

Having thus described my invention, what I claim as new therein, and desire to secure by Letters Patent, is—

1. A burner comprising a jacketed tube tapering from its outlet to its inlet, a wire-gauze covering said outlet, and a gas-supply pipe in communication with said tube and its jacket, for the purpose set forth.

2. A burner comprising a burner-tube tapering from its outlet to its inlet, a gas-passage leading to the burner expanding from a point intermediate of its inlet and outlet to the latter, and a mixing-chamber connected with the inlet of said passage and having its walls converging to said inlet formed of paraboloidal curves, and provided with air-ports $m^2$, $m'$ respectively, of an injector-nozzle projecting axially into said mixing-chamber, substantially as and for the purpose set forth.

3. The combination with a burner comprising a cylindrical burner-tube, a wire-gauze protector covering the mouth thereof, and an inwardly-tapering tube fitting fluid-tight into said mouth, of a mixing-chamber, a conical injector-nozzle projecting axially into the same, the walls of said chamber at the outlet thereof being formed by paraboloidal curves converging to said outlet, two sets of air-ports $m'$ $m^2$ formed in the chamber-walls and disposed relatively to the injector-nozzle, as set forth, and a passage leading from the outlet of the chamber to the inlet of the auxiliary burner-tube, said passage of gradually-increasing cross-sectional area from a point intermediate of the chamber-outlet and the inlet to the auxiliary tube, substantially as and for the purpose set forth.

In testimony that I claim the foregoing as my invention I have signed my name in presence of two subscribing witnesses.

PAUL GREYSON DE SCHODT.

Witnesses:
ALPHONSE DE LUIGE,
HENIO RACLOT.